Jan. 27, 1970 E. Y. BENNETT, JR 3,492,472

FUNCTION GENERATOR

Filed May 15, 1967 3 Sheets-Sheet 1

| 1 | 2 | 3 | 4 | 5 | 6 | 7 | | | | | | | | | | | | | | |
|---|---|---|---|---|---|---|---|---|---|---|---|---|---|---|---|---|---|---|---|---|
| STEP | $V_{in}$ and $V_F$ | $V_{cs} = V_Z - V_F$ | $V_o$ | $V_L = V_F + V_o$ | $I_L$ (Ma.) | $V_R$ | R1 | R2 | R3 | R4 | R5 | R6 | R7 | R8 | R9 | R10 | R11 | R12 | R13 | R14 |
| 1 | -10.000 | 7.750 | 20.000 | 30.000 | 3.0000 | 7.550 | ▨ | | | | | | | | | | | | | |
| 2 | -8.875 | 8.875 | 25.000 | 33.875 | 3.3875 | 8.675 | ▨ | ▨ | | | | | | | | | | | | |
| 3 | -7.750 | 10.000 | 30.000 | 37.750 | 3.7750 | 9.800 | ▨ | ▨ | ▨ | | | | | | | | | | | |
| 4 | -7.000 | 10.750 | 35.000 | 42.000 | 4.2000 | 10.550 | ▨ | ▨ | ▨ | ▨ | | | | | | | | | | |
| 5 | -6.250 | 11.500 | 40.000 | 46.250 | 4.6250 | 11.300 | ▨ | ▨ | ▨ | ▨ | ▨ | | | | | | | | | |
| 6 | -5.500 | 12.250 | 45.000 | 50.500 | 5.0500 | 12.050 | ▨ | ▨ | ▨ | ▨ | ▨ | ▨ | | | | | | | | |
| 7 | -5.000 | 12.750 | 50.000 | 55.000 | 5.5000 | 12.550 | ▨ | ▨ | ▨ | ▨ | ▨ | ▨ | ▨ | | | | | | | |
| 8 | -4.500 | 13.250 | 55.000 | 59.500 | 5.9500 | 13.050 | ▨ | ▨ | ▨ | ▨ | ▨ | ▨ | ▨ | ▨ | | | | | | |
| 9 | -3.875 | 13.875 | 60.000 | 63.875 | 6.3875 | 13.675 | ▨ | ▨ | ▨ | ▨ | ▨ | ▨ | ▨ | ▨ | ▨ | | | | | |
| 10 | -2.875 | 14.875 | 70.000 | 72.875 | 7.2875 | 14.675 | ▨ | ▨ | ▨ | ▨ | ▨ | ▨ | ▨ | ▨ | ▨ | ▨ | | | | |
| 11 | -2.125 | 15.625 | 80.000 | 82.125 | 8.2125 | 15.425 | ▨ | ▨ | ▨ | ▨ | ▨ | ▨ | ▨ | ▨ | ▨ | ▨ | ▨ | | | |
| 12 | -1.375 | 16.375 | 90.000 | 91.375 | 9.1375 | 16.175 | ▨ | ▨ | ▨ | ▨ | ▨ | ▨ | ▨ | ▨ | ▨ | ▨ | ▨ | ▨ | | |
| 13 | -0.625 | 17.125 | 100.000 | 100.625 | 10.0625 | 16.925 | ▨ | ▨ | ▨ | ▨ | ▨ | ▨ | ▨ | ▨ | ▨ | ▨ | ▨ | ▨ | ▨ | |
| 14 | 0.000 | 17.750 | 110.000 | 110.000 | 11.0000 | 17.550 | ▨ | ▨ | ▨ | ▨ | ▨ | ▨ | ▨ | ▨ | ▨ | ▨ | ▨ | ▨ | ▨ | ▨ |

▨ INDICATES CONSTANT CURRENT AREA

FIG. 1

INVENTOR
EDWARD Y. BENNETT JR.

BY Jeffers and Young
ATTORNEYS

Jan. 27, 1970 E. Y. BENNETT, JR 3,492,472

FUNCTION GENERATOR

Filed May 15, 1967 3 Sheets-Sheet 2

INVENTOR
EDWARD Y. BENNETT JR.

BY Jeffers and Young
ATTORNEYS

Jan. 27, 1970 E. Y. BENNETT, JR 3,492,472

FUNCTION GENERATOR

Filed May 15, 1967 3 Sheets-Sheet 3

INVENTOR
EDWARD Y. BENNETT JR.

BY Jeffers and Young
ATTORNEYS

United States Patent Office 3,492,472
Patented Jan. 27, 1970

3,492,472
FUNCTION GENERATOR

Edward Y. Bennett, Jr., New Haven, Ind., assignor to The Magnavox Company, Fort Wayne, Ind., a corporation of Delaware Filed May 15, 1967, Ser. No. 638,212
Int. Cl. G06f *15/34;* G06g *7/26*
U.S. Cl. 235—197 8 Claims

ABSTRACT OF THE DISCLOSURE

A function generator produces specified output signal magnitudes in response to specified input signal magnitudes. The generator includes a closed loop series regulator having a current sink in its feedback circuit.

BACKGROUND OF THE INVENTION

My invention relates to a function generator, and particularly to a function generator for producing an output signal having specified magnitudes for specified magnitudes of an input signal.

Many circuits require for control or operation, a signal or voltage which varies in magnitude in a predetermined fashion with respect to some other related factor or variable such as time, mechanical function or the like. Such signals or voltages are not always easily generated or supplied by simple or conventional circuits but may be obtained by modifying or converting the output signals of conventional generating circuits to signals which have the required characteristics or functions. Although the use of my invention is not limited to the following example, one such circuit is an oscillator whose frequency is to be varied or swept by changing the capacity in the oscillator tuning circuit. All or part of the capacity is provided by a varactor or diode whose capacity changes with applied voltage. Usually, the capacity of a varactor varies nonlinearly with the applied voltage, and where it is desirable that the oscillator frequency vary either linearly or in some other specified manner with respect to time or some other factor, a signal or voltage is required which will in turn cause the oscillator frequency to vary accordingly.

Accordingly, an object of my invention is to provide a signal that varies in a specified manner relative to an input signal.

Another object of my invention is to provide an improved function generator that converts an input signal into a specified output signal.

Another object of my invention is to provide a function generator that converts input signal magnitudes into output signal magnitudes having specified relationships or ratios for each set of input and output signals.

Operating conditions for a circuit, such as the oscillator mentioned above, may specify output voltages or signal magnitudes for selected or specified input voltages or signal magnitudes. Thus, the output signal must follow or track the input signal at specific points in a specified relation or manner.

Accordingly, another object of my invention is to provide a function generator that produces an output signal of a specific magnitude for each of a number of specific or selected points of the input signal irrespective of the magnitudes of the input signal before and after each specific point.

Another object of my invention is to provide an improved function generator for producing a signal that varies in a specified manner with respect to an input signal.

SUMMARY OF THE INVENTION

Briefly, these and other objects are achieved in accordance with my invention by a closed loop series regulator circuit to which the input signal is applied and from which the output signal is derived. A current sink which absorbs or supplies specific and varying amounts of current is coupled to the feedback circuit of the closed loop series regulator circuit. The resultant voltage from the feedback circuit is compared with the input voltage to cause the series regulator to either increase or decrease the voltage at the output. Thus, the output voltage has the desired magnitude for each specific and selected magnitude of the input signal. The invention disclosed herein will operate satisfactorily with input signals which are either continuously variable or which are of a steady state nature, or which are of a random sequence combination of both.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

FIGURE 1 shows a table giving illustrative values of a typical input signal, illustrative values of an output signal for each value of the input signal, and other circuit parameters which explain the operation of my circuit;

DESCRIPTION OF THE PREFERRED EMBODIMENTS

With reference to FIGURE 1, Column 1 shows one set of the selected steps at which specified voltage magnitudes of an input voltage or signal $V_{in}$ (Column 2) are to be converted to specified voltage magnitudes of an output signal $V_o$ (Column 4). In Column 2, the input voltage $V_{in}$ varies in a generally sawtooth fashion from −10 volts at Step 1 to zero volts at Step 14. However, it is to be understood that the input voltage may vary up and down, and that other magnitudes of the input voltage may be specified for the steps. Also, any number of steps may be specified. As shown in Column 4, the desired output voltage $V_o$ varies from 20 volts to 110 volts with the indicated or specified magnitudes at each of the 14 steps. Thus, the input signal or voltage $V_{in}$ shown in Column 2 must be converted to the output signal or voltages $V_o$ shown in Column 4 for each of the specified steps. It is desirable that the transition of the output voltage $V_o$ between each step be smooth so that the output voltage $V_o$ varies in a smooth or nonerratic fashion. As mentioned previously, such an output voltage is desirable for various purposes such as varying the voltage across a varactor diode to change the frequency of an oscillator.

Figure 2:
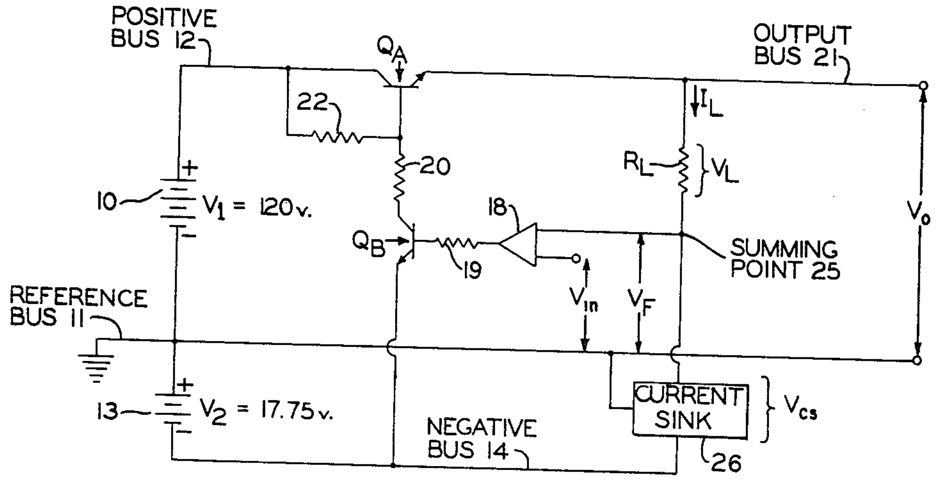
FIGURE 2 shows a circuit diagram of my function generator with the current sink shown as a block diagram.

FIGURE 2 shows one embodiment of my function generator for converting or changing the input voltage $V_{in}$ shown in Column 2 to the output voltage $V_o$ in Column 6 at respective specified Steps 1 through 14 in FIGURE 1. My function generator includes a source 10 of direct current voltage $V_1$ which has a magnitude of 120 volts. The source 10 has its negative terminal connected to a reference bus 11 and its positive terminal connected to a positive bus 12. A second source 13 of direct current voltage $V_2$ having a magnitude of 17.75 volts is also provided. The positive terminal of the source 13 is connected to the reference bus 11, and the negative terminal of the source 13 is connected to a negative bus 14.

The input voltage $V_{in}$ relative to the reference bus 11 is applied to one input terminal of an error indicating circuit or differential type amplifier 18. The output of the amplifier 18 is coupled through a resistor 19 to the base electrode of an NPN type transistor $Q_B$. The emitter of the transistor $Q_B$ is coupled to the negative bus 14, and the collector of the transistor $Q_B$ is coupled through a resistor 20 to the base electrode of an NPN type transistor $Q_A$ is coupled to the positive bus 12, and the emitter of the transistor $Q_A$ is coupled to an output bus 21. The output voltage $V_o$ is derived between the output bus 21 and the reference bus 11. A base-collector resistor 22 is also coupled to the transistor $Q_A$. The output bus 21 is coupled through a load resistor $R_L$ to a summing point 25 which is coupled to the feedback input of the amplifier 18. A current $I_L$ flows through the resistor $R_L$ and produces a voltage drop $V_L$ across the resistor $R_L$. A feedback voltage $V_F$ is supplied between the summing point 25 and the reference bus 11. The amplifier 18 and the transistors $Q_A$ and $Q_B$ are coupled in an error measuring or closed loop series regulating circuit so that the feedback voltage $V_F$ tends to track or follow the input voltage $V_{in}$. Hence, the voltages listed in Column 2 of FIGURE 1 represent both the input voltage $V_{in}$ and the feedback voltage $V_F$. The summing point 25 is coupled to a current sink 26 which is constructed in accordance with my invention as will be described. The current sink 26 is also coupled to the reference bus 11 and the negative bus 14. The current sink 26 has a voltage drop $V_{CS}$ across it as indicated in FIGURE 2.

As mentioned above, the feedback voltage $V_F$ tracks or follows the input voltage $V_{in}$ very closely, so that the two voltages have substantially the same magnitude. This is indicated in Column 2 of FIGURE 1. It will be understood, however, that there is actually a slight voltage difference between the two voltages $V_F$ and $V_{in}$, depending on the circuit gain of the current regulating circuit. However, this slight difference may be ignored in the following description of the operation of my function generator shown in FIGURE 2. In FIGURE 2, the voltage across the current sink 26 is represented as the voltage $V_{CS}$, and this voltage is, as shown in Column 3, equal to the difference between the voltage $V_2$ of the source 13 and the feedback voltage $V_F$. By conventional circuit theory beginning at the reference bus 11, the voltage drop $V_2$ across the source 13, the voltage rise $V_{CS}$ across the current sink 26, and the voltage rise $V_F$ between the summing point 25 and the reference bus 11 are equal to zero. If these terms are transposed, the voltage $V_{CS}$ across the current sink 26 is numreically equal to the voltage $V_2$ across the source 13 minus the feedback voltage $V_F$. Thus, at Step 1, the voltage $V_{CS}$ is equal to 17.75 volts minus 10 volts, or 7.750 volts. The voltages $V_{CS}$ for the other steps are similarly calculated. Column 5 of the table in FIGURE 1 shows the voltage $V_L$ across the load resistor $R_L$. By conventional circuit theaory beginning at the reference bus 11, the output voltage $V_o$ rise, the voltage drop $V_L$ across the resistor $R_L$, and the voltage rise $V_F$ are equal to zero. If these terms are transposed, the voltage $V_L$ is numerically equal to the feedback voltage $V_F$ plus the output voltage $V_o$. Thus, at Step 1, the vlotage $V_L$ is equal to the feedback voltage $V_F$ of 10 volts plus the output voltage $V_o$ of 20 volts, or 30 volts. The other steps are similarly calculated. It has been assumed that the load resistor $R_L$ has a magnitude of 10,000 ohms, and the current $I_L$ through the resistor $R_L$ for the various voltages is equal to the voltage $V_L$ divided by this magnitude. Column 6 shows the current values in milliamperes for the Steps 1 through 14.

Figure 3:
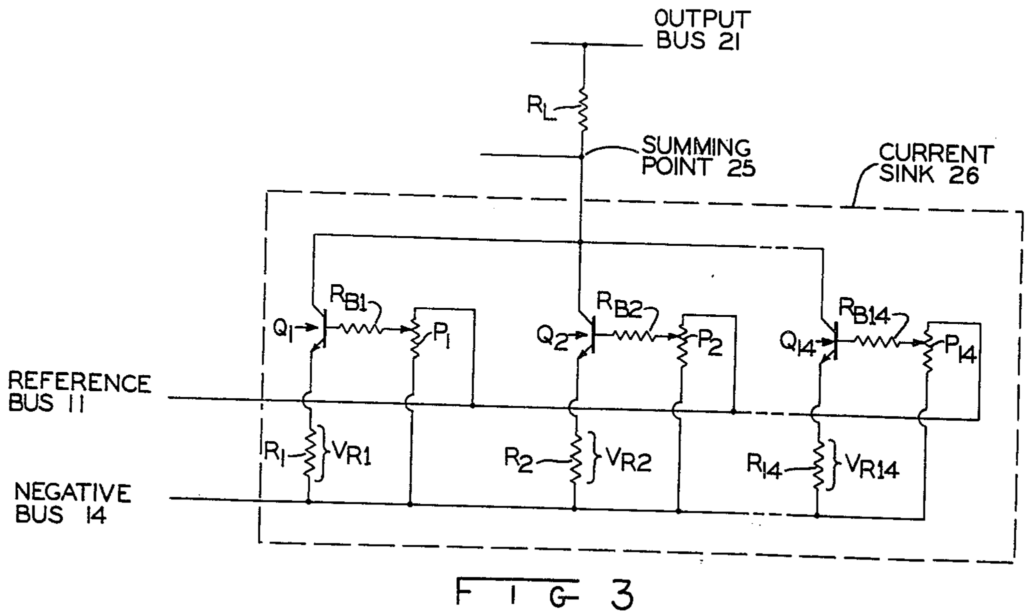
FIGURE 3 shows a circuit diagram of one embodiment of my current sink which may be used in the function generator of FIGURE 2.

In order to provide the currents listed in Column 6 at the various steps and hence provide the output voltage $V_o$ at the various steps, I provide the current sink 26 having a plurality of parallel current paths which take or absorb the various amounts of current listed in Column 6. FIGURE 3 shows the schematic or circuit diagram of the current sink 26. Since there are 14 specified steps, the current sink 26 theoretically comprises 14 NPN type transistors. But only three transistors $Q_1$, $Q_2$, and $Q_{14}$ are shown in order to simplify the illustration of the circuit. The other transistors $Q_3$ through $Q_{13}$ would be similarly connected into the circuit between the dashed line portions. The collector of each of the transistors is connected to the summing point 25, and the emitter of each of the transistors is connected through a respective resistor R to the negative bus 14. The base of each of the transistors is connected through a base resistor $R_B$ to the movable contact of a potentiometer P. The potentiometer P of each transistor is connected between the reference bus 11 and the negative bus 14. In FIGURE 3, each of the transistors is indicated by the letter Q followed by a number, each of the emitter resistors is indicated by the letter R followed by a number, each of the base resistors is indicated by the letters $R_B$ followed by a number, and each of the potentiometers is indicated by the letter P followed by a number. When any one of the transistors $Q_1$ through $Q_{14}$ is carrying a saturation current, the voltage drop $V_R$ across the respective one of the resistors $R_1$ through $R_{14}$ is equal to the voltage $V_{CS}$ (Column 3) across the current sink 26 minus the saturation voltage across the emitter and collector of the transistor. If this saturation votage is assumed to be 0.2 volt for the transistors $Q_1$ through $Q_{14}$, then the voltage drop $V_R$ for each of the steps has the value shown in Column 7. For example, at Step 1, the voltage $V_R$ is 7.750 volts minus 0.2 volt, or 7.550 volts. The other voltages $V_R$ are similarly calculated. The remainder of the columns of the table of FIGURE 1 indicate the step at which the voltage drop $V_R$ across each one of the emitter resistors R saturates or limits the current through its respective transistor Q. In other words, these remaining columns indicate the point at which each of the parallel current paths limit the current therethrough. This limiting is determined by the setting of the movable contact on each of the respective potentiometers P. For example, at Step 1, when the input voltage $V_{in}$ is at $-10.000$ volts and the current sink voltage $V_{CS}$ is 7.750 volts, the potentiometer $P_1$ is set so that the transistor $Q_1$ passes no more current when the voltage $V_R$ across its emitter resistor $R_1$ reaches 7.550 volts. If, after the voltage drop across the emitter resistor $R_1$ reaches 7.550 volts, the transistor $Q_1$ attempts to pass more current, it tends to bias itself off because of the setting of its potentiometer $P_1$. Hence, when the transistor $Q_1$ passes a current that causes the voltage drop across the emitter resistor $R_1$ to reach a voltage of 7.550 volts, the transistor $Q_1$ passes no greater magnitude of current. As the input voltage $V_{in}$ increases to $-8.875$ volts at Step 2, potentiometer $P_2$ is set so that the transistor $Q_2$ passes no more current when the voltage across its emitter resistor $R_2$ reaches 8.675 volts. The other potentiometers are set to provide the current limiting conditions for the other voltages indicated in Column 7. The columns or shaded areas in the remainder of the table of FIGURE 1 show the voltages at which the respective emitter resistors R and the potentiometers P limit the current magnitude in their respective transistors Q.

The values of the resistors $R_1$ through $R_{14}$ were calculated as follows:

First, it was assumed that $X=A+B+C+D \ldots +N$, where $A=1/R_1$, $B=1/R_2$, $C=1/R_3 \ldots N=1/R_{14}$. For Step 1, the following equation was written:

$$7.550(X)=3.0000$$

where X is defined as above, where 7.550 is the voltage drop $V_R$ at Step 1, and 3.0000 is the current in milliamperes at Step 1. For Step 2, the following equation was written:

$$7.550(A)+8.675(X-A)=3.3875$$

For Step 3, the following was written:

$$7.550(A)+8.675(B)+9.800(X-A-B)=3.7750$$

Similar equations were written for Steps 4 through 14. These 14 equations were solved, and the following values in ohms were found for the emitter resistors:

| | |
|---|---|
| $R_1=18,901$ | $R_8=5,000$ |
| $R_2=0.14062\times10^{11}$ | $R_9=-5,000$ |
| $R_3=-4,499$ | $R_{10}=-2,999$ |
| $R_4=0.75000\times10^{10}$ | $R_{11}=0.99999\times10^{49}$ |
| $R_5=0.99999\times10^{49}$ | $R_{12}=0.99999\times10^{49}$ |
| $R_6=-2,999$ | $R_{13}=-3,749$ |
| $R_7=0.16666\times10^{10}$ | $R_{14}=666$ |

In the above table, it will be noted that resistors $R_3$, $R_6$, $R_9$, $R_{10}$, and $R_{13}$ have negative values. This has been assumed to mean that their respective transistors $Q_3$, $Q_6$, $Q_9$, $Q_{10}$, and $Q_{13}$ supply current toward the summing point 25 rather than away from the summing point 25. The transistors connected in the current sink 26 shown in FIGURE 3 cannot supply current in this direction, so that an additional current sink must be provided to provide the negative resistance or current toward the summing point 25. This circuit will be explained in connection with FIGURE 4. In the above table, $R_2$, $R_4$, $R_5$, $R_7$, $R_{11}$, and $R_{12}$ have magnitudes so large that they may be ignored. Hence, a current sink providing positive types of resistors $R_1$, $R_3$, and $R_{14}$ is needed, and a current sink providing negative types of resistors $R_3$, $R_6$, $R_9$. $R_{10}$, and $R_{13}$ is needed. The circuit of these current sinks is shown in FIGURE 4.

Figure 4:
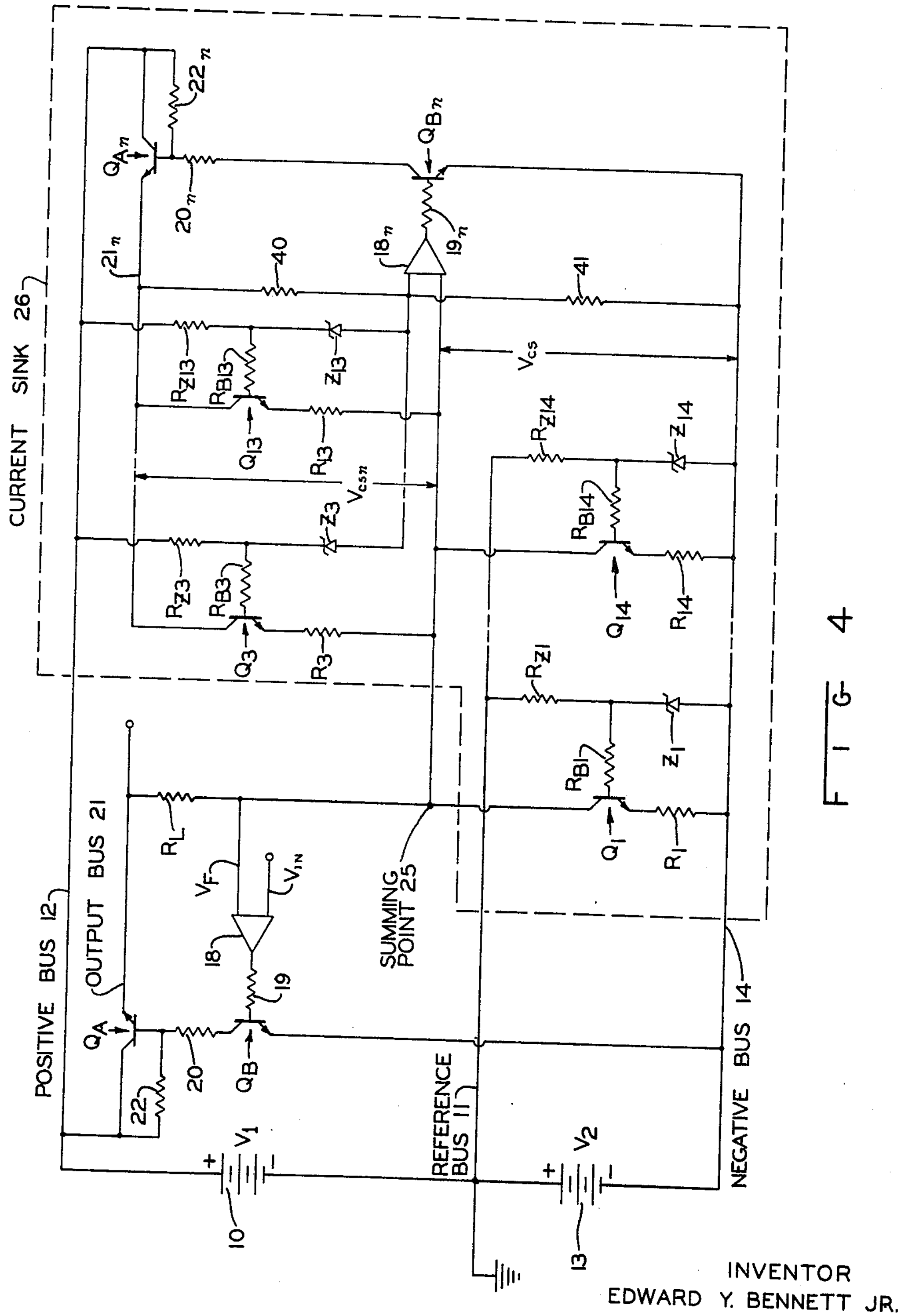
FIGURE 4 shows another embodiment of my current sink which may be used in the function generator of FIGURE 2.

In FIGURE 4, circuit elements corresponding to the elements in FIGURE 3 have been given the same reference numeral or legend, or the same reference numeral or legend followed by the letter *n* to indicate its negative resistance function. In FIGURE 4, the transistors $Q_1$, $Q_8$, and $Q_{14}$ and associated circuit elements would be connected between the reference bus 11 and the negative bus 14, but only the transistors $Q_1$ and $Q_{14}$ and their associated circuit elements have been shown in the interest of clarity. In the negative resistor portion of the current sink 26, an amplifier **18*n* has one input connected to the summing point 25. The feedback input is connected to a voltage divider comprising two resistors 40, 41 connected between an output bus 21*n* and the negative bus 14. The amplifier 18*n* has its output coupled through a resistor 19*n* to a closed loop regulating circuit having two transistors $Q_{An}$ and $Q_{Bn}$. The emitter of the transistor $Q_{An}$ is connected to the output bus 21*n*. By this circuit, the voltage $V_{CSn}$ across the negative portion of the current sink is kept equal to the voltage $V_{CS}$ across the other portion of the current sink. The transistors $Q_3$, $Q_6$, $Q_9$, $Q_{10}$, and $Q_{13}$ and associated circuit elements would be connected between the output bus 21*n*, and/or the positive bus 12, and the feedback input of the amplifier 18*n*, but only the transistors $Q_3$ and $Q_{13}$ and their associated circuit elements have been shown in the interest of clarity. In FIGURE 4, it will be noted that the potentiometers for the transistors have been replaced by voltage reference or Zener diodes Z and resistors $R_Z$. The Zener diodes Z and resistors $R_Z$ are indicated by the letters followed by a number corresponding to the associated transistor number. The resistors $R_Z$ and the Zener diodes Z are selected to determine the maximum current magnitude which their respective transistors Q may conduct in the same manner as the potentiometers P. If a transistor Q attempts to conduct more current, its emitter resistor R tends to bias or turn the transistor off. The values for the emitter resistors R were calculated by first selecting the voltage level for the Zener diodes Z, and then determining the value of the resistance R which would limit the current through the respective transistor Q to the desired magnitude. In the negative portion of the current sink 26, it will be seen that the transistors $Q_3$ and $Q_{13}$, as well as the other negative resistance transistors $Q_6$, $Q_9$, and $Q_{10}$ (not shown), supply current toward the summing point 25**. Thus, their respective resistors $R_3$ and $R_{13}$, and resistors $R_6$, $R_9$, and $R_{10}$ (not shown), present a negative value to the circuit and provide the desired output voltage $V_o$.

It will thus be seen that my invention provides an improved function generator for producing an output signal which has specified output magnitudes at specified points or steps relative to an input signal. This circuit is provided by a closed loop series type of regulator having a current sink in the feedback network, and permits the output signal to have almost any specified shape or magnitude at specified points. Persons skilled in the art will appreciate that modifications may be made. Almost any desired type of input signal may be tracked at any desired points to produce an output signal having selected magnitudes at these points. Various circuit voltages may be used, and other types of semiconductors and base control circuits may also be used. Therefore, while my invention has been described with reference to particular embodiments, it is to be understood that modifications may be made without departing from the spirit of the invention.

What I claim as new and desire to secure by Letters Patent of the United States is:

1. A circuit for converting *n* specified input signal magnitudes into *n* specified output signal magnitudes respectively, where *n* is an integer greater than two, comprising:

(a) current control means having a control input, a feedback input, and a controlled output;

(b) means for applying said input signal to said control input;

(c) means connecting said controlled output to said feedback input for applying a feedback signal to said feedback input, said feedback signal varying as a function of an output signal at said controlled output;

(d) and a current flow path connected to said connecting means for providing a current flow that varies as a predetermined function of said feedback signal, and thereby changes said output signal at said controlled output to one of said *n* specified magnitudes when said input signal is at the corresponding one of said *n* input magnitudes.

2. The circuit of claim 1 wherein said current flow path provides a current flow in only one direction relative to said connecting means.

3. The circuit of claim 1 wherein said current flow path provides a current flow in both directions relative to said connecting means.

4. A function generator for converting an input signal to an output signal having *n* specified magnitudes for *n* specified points with respect to said input signal, where *n* is an integer greater than two, comprising:

(a) a closed loop series regulator circuit having an input circuit for said input signal, an output circuit for said output signal, a feedback input, and a feedback circuit connected between said output circuit and said feedback input;

(b) and a current sink connected to said feedback circuit, said current sink comprising *n* parallel current paths, each of said paths limiting the current magnitudes therethrough at a respective specified voltage at said feedback input.

5. The function generator of claim 4 wherein said current paths supply current in one direction relative to said feedback circuit.

6. The function generator of claim 4 wherein said current sink comprises a second plurality of parallel current paths limiting the current magnitude therethrough at a respective specified voltage at said feedback input.

7. The function generator of claim 6 wherein said first plurality of parallel current paths supplies current in a first direction relative to said feedback circuit and wherein said second plurality of parallel current paths supplies current in a second direction relative to said feedback circuit that opposes said first direction.

8. The circuit of claim 1 wherein said output signal is continuous but unspecified between adjacent ones of said *n* specified magnitudes.

References Cited

UNITED STATES PATENTS

| | | | |
|---|---|---|---|
| 3,064,898 | 11/1962 | Walker | 235—197 |
| 3,082,952 | 3/1963 | Brown | 235—197 |
| 3,205,454 | 9/1965 | Lowe | 235—197 X |
| 3,259,760 | 7/1966 | Morey et al. | 328—151 X |
| 3,348,115 | 10/1967 | Orton | 328—151 X |
| 3,364,466 | 1/1968 | Stine | 328—151 X |
| 3,398,373 | 8/1968 | Caswell | 328—150 X |

MALCOLM A. MORRISON, Primary Examiner

ROBERT W. WEIG, Assistant Examiner